United States Patent [19]
Asai et al.

[11] Patent Number: 5,148,336
[45] Date of Patent: Sep. 15, 1992

[54] MAGNETIC RECORDING AND REPRODUCING APPARATUS

[75] Inventors: Shigemi Asai; Masanobu Furukawa; Shigeaki Kakiwaki; Tadashi Iwamatsu; Tohru Okuda, all of Nara, Japan

[73] Assignee: Sharp Kabushiki Kaisha, Osaka, Japan

[21] Appl. No.: 604,624

[22] Filed: Oct. 26, 1990

[30] Foreign Application Priority Data

Nov. 1, 1989 [JP] Japan .................. 1-287084

[51] Int. Cl.$^5$ .......................................... G11B 5/008
[52] U.S. Cl. ........................................ 360/95; 360/75
[58] Field of Search ............... 360/95, 75, 109, 96.1

[56] References Cited

U.S. PATENT DOCUMENTS

| | | | |
|---|---|---|---|
| 4,309,733 | 1/1982 | Tomabechi | 360/75 X |
| 4,422,112 | 12/1983 | Tanaka | 360/75 X |
| 4,477,851 | 10/1984 | Dalziel et al. | 360/95 |
| 4,779,149 | 10/1988 | Watanabe | 360/75 X |
| 4,802,030 | 1/1989 | Henry et al. | 360/75 X |
| 5,014,141 | 5/1991 | Gervais et al. | 360/95 X |
| 5,016,030 | 5/1991 | Dwyer et al. | 360/109 X |

FOREIGN PATENT DOCUMENTS

| | | | |
|---|---|---|---|
| 56-74822 | 6/1981 | Japan | |
| 59-168294 | 10/1984 | Japan | |
| 60-106085 | 6/1985 | Japan | 360/95 |
| 1-25133 | 5/1989 | Japan | |

Primary Examiner—John H. Wolff
Attorney, Agent, or Firm—David G. Conlin; Robert F. O'Connell

[57] ABSTRACT

A magnetic recording and reproducing apparatus utilizing a magnetic tape in a cassette, the tape being driven by reels and information data being recorded or reproduced on or from the magnetic tape. The apparatus includes a mechanism for pulling or storing the magnetic tape out of or in the cassette which mechanism includes a pair of guide rollers for restricting the running path of the magnetic tape, the guide rollers being movable between an unloading position and a loading position. A magnetic head, which can be a multi-track magnetic head having a plurality of magnetic heads, the number of which is defined to be smaller than the number of tracks standardized as a track format on the magnetic tape, records or reproduces information-data when the guide rollers are in their loading position and the head is allowed to vertically move each time the running direction of the magnetic tape is changed.

23 Claims, 12 Drawing Sheets

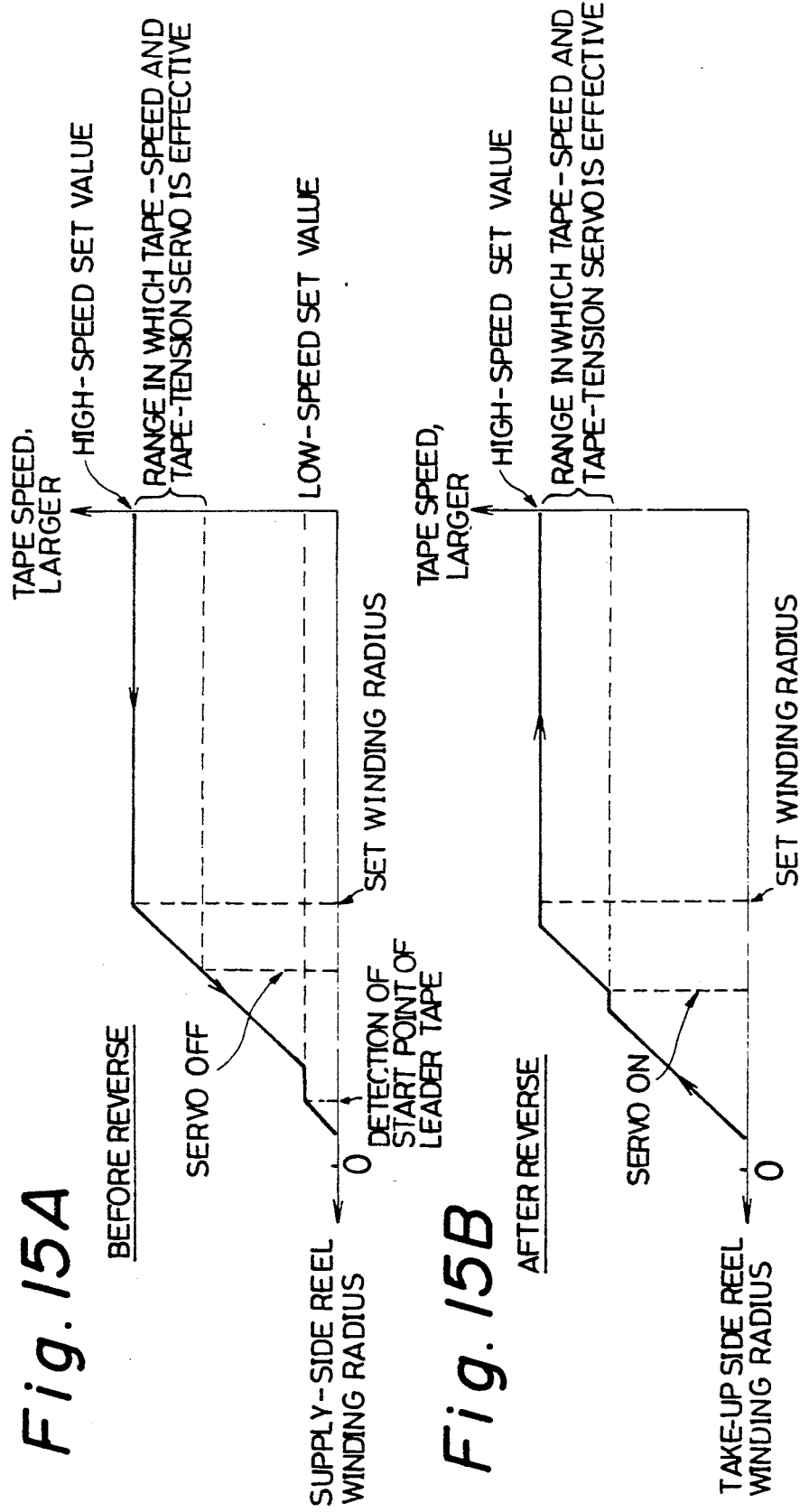

MAGNETIC RECORDING AND REPRODUCING APPARATUS

BACKGROUND OF THE INVENTION

1. Field of the Invention

The present invention relates to a magnetic recording and reproducing apparatus which is capable of rapidly recording or reproducing a large amount of data on or from a magnetic tape and can be used as a data streamer, for example.

2. Description of the Related Art

Traditionally, a reel driving type recording and reproducing apparatus employs three kinds of tape speed control systems.

A first kind of tape speed control system is constructed to control a speed of a magnetic tape by reading a speed control signal recorded on one track of the magnetic tape while the tape is running. The magnetic recording and reproducing apparatus employing this system is, herein, referred to as a first type apparatus.

A second kind of tape speed control system is constructed to control a speed of a magnetic tape based on a tape winding diameter of a take-up reel or a supply reel. The tape winding diameter is measured while the tape is running. The magnetic recording and reproducing apparatus employing this system is, herein, referred to as a second type apparatus.

A third kind of tape speed control system is constructed to control a speed of a magnetic tape based on a running speed of the magnetic tape detected by a speed detector like a rotary encoder. The magnetic recording and reproducing apparatus employing this system is, herein, referred to as a third type apparatus.

For explaining concrete construction of the reproducing and recording apparatus outlined above, as an example, the third type apparatus will be described hereinafter.

A cassette designed according to the DCAS format has two reels on which a magnetic tape is wound inside of itself. The cassette molded by injecting a resin has some guide pins which are formed integrally.

When the cassette is loaded to the recording and reproducing apparatus, a light-emitting diode is opposed to the back surface of the magnetic tape, while a photodiode, a first tape guide, a magnetic head, a second tape guide and a speed-detecting roller are opposed to the right surface of the magnetic tape. When recording or reproducing information on or from the magnetic tape, the first tape guide, magnetic head, the second tape guide and speed-detecting roller come into contact with the magnetic tape, in which case the speed detecting roller is rolling. The light-emitting diode and the photodiode between the magnetic tape is located are used for detecting a start point and an end point of the magnetic tape.

The speed-detecting roller is linked to a rotary encoder so that the rotary encoder can detect the running speed of the magnetic tape.

The recording and reproducing apparatus includes a closed-loop control circuit having a difference operational circuit, a crystal oscillator, a reel motor driving circuit, the light-emitting diode, and the photodiode, both of which are mentioned above.

The rotary encoder supplies an output signal to the difference operational circuit at which the output signal is subtracted from a reference speed output signal of the crystal oscillator.

The difference operational circuit supplies an output signal representing a deviation between the running speed of the magnetic tape and the reference speed. The output signal is supplied to the reel motor driving circuit in which the signal is converted into a voltage matching to the deviation.

The reel motor driving circuit supplies the resulting voltage to two reel motors through a switch by which the magnetic tape is allowed to be switched to one of the running directions.

The foregoing closed-loop speed control system is constructed to control the running speed of the magnetic tape in both directions. The magnetic recording and reproducing apparatus employing the foregoing arrangement is referred to as a fourth type apparatus for the convenience of the description.

The foregoing four apparatuses, however, have the disadvantages mentioned below.

The first type apparatus requires on a recording format included in the magnetic tape a dedicated track for recording a speed control signal. Hence, this apparatus is disadvantageous in light of high density recording and requires a costly magnetic tape because it is necessary to record a speed control signal on the magnetic tape in advance. Further, the apparatus also has a disadvantage that the speed cannot be precisely controlled if a drop-out takes place in detecting the speed control signal.

The second type apparatus is weak to an irregular thickness of the magnetic tape, an irregular winding of the magnetic tape provided on the reel and a dimensional error of the reel. The apparatus thus has a disadvantage that it is impossible to detect a running speed of the magnetic tape with high precision and stably control the speed of the magnetic tape.

The third type apparatus requires additional provision of a speed detector like the rotary encoder for detecting a running speed of the magnetic tape. The apparatus disadvantageously has large restrictions about reduction of an overall apparatus and lowering the cost.

The fourth type apparatus has a disadvantages mentioned below in addition to the aforementioned disadvantages.

That is, the guide pins which are integrally formed with the cassette molded by injecting a resin, are inevitably formed to be tapered since the metallic mold normally has a draft. The tapered form of the guide pins disadvantageously brings about vertical snaking of the magnetic tape. The first and second tape guides disallow the snaking to be positively suppressed since the guide pins are positioned inside of the first and second tape guides. Another method may be provided wherein the guide pins are made of ceramic and are mounted in the cassette as separate members. This method, however, is not substantially effective in overcoming the disadvantage if the change of the cassette allows the guide pins to be substantially inclined because the cassette is made of a resin material and a dimensional variation is caused among a plurality of cassettes. In other words, the mechanical construction of the fourth type apparatus has a large disadvantage that it cannot achieve stable running of the magnetic tape and secure the running precision of the magnetic tape without depending on the cassette.

The foregoing disadvantages are a practically large obstacle in keeping the capacity and the speed of the magnetic recording and reproducing apparatus larger and faster.

SUMMARY OF THE INVENTION

It is therefore an object of the present invention to provide a magnetic recording and reproducing apparatus which is capable of running a magnetic tape at a high speed and with high precision without having to depend on a cassette used therein and is fitted for high-density recording of the magnetic tape.

According to a first aspect of the invention, the magnetic recording and reproducing apparatus serving to run a magnetic tape provided in a cassette with reels being driven includes a tape loading means for pulling the magnetic tape out of the cassette loaded into the apparatus and alternately moving a pair of guide rollers restricting a running path of the pulled magnetic tape from an unloading position to a loading position or vice versa and a magnetic head for recording and reproducing data on or from the magnetic tape whose running path is restricted by the pair of guide rollers.

According to a second aspect of the present invention, the magnetic recording and reproducing apparatus serving to run the magnetic tape provided in a cassette back and forth with reels being driven and to record or reproduce information data on or from the magnetic tape based on the surpentine recording system includes a tape loading means for pulling the magnetic tape out of the cassette loaded in the apparatus and alternately moving a pair of guide rollers restricting the running path of the pulled magnetic tape from a loading position to an unloading position or vice versa and multi-track magnetic head located in opposition to the cassette and having a smaller number of magnetic heads than the number of tracks regulated on the magnetic tape as a track format. The multi-track magnetic head is allowed to vertically move each time the running direction of the magnetic tape is switched so that the information data can be recorded or reproduced at each group of tracks on or from the magnetic tape whose running path is restricted by the pair of guide rollers.

According to a third asepct of the present invention, the magnetic recording and reproducing apparatus has the construction designed according to the second aspect. It serves to detect vertical snaking of the magnetic tape caused in running the magnetic tape and minutely and vertically move the multi-track magnetic head.

In operation, the magnetic recording and reproducing apparatus constructed according, to the first aspect takes the steps of loading the cassette to the apparatus, operating the tape loading means, moving the pair of guide rollers from the unloading position to the loading position, and pulling the magnetic tape out of the cassette. Then, the running path of the pulled magnetic tape is restricted by the pair of guide rollers so that the magnetic tape comes into contact with the magnetic tape fixed on the way of the running path. When the magnetic tape is driven by the reels in the contact state, the information data are recorded or reproduced on or from the magnetic tape through the magnetic head with which the magnetic tape comes into contact. When the recording and reproduction are finished, the tape loading meams is operated reversely so that the pair of guide rollers is moved from the loading positions to the unloading position and at the same time the driving force of the reels serves to hold the pulled magnetic tape in the cassette.

The magnetic recording and reproducing apparatus constructed according to the second aspect takes the same steps of that of the first aspect when the pair of guide rollers form the running path of the magnetic tape and the magnetic tape is held in the cassette. Hence, the description will be directed to how the information data are recorded and reproduced on or from the magnetic tape in the apparatus constructed according to the second aspect.

When the magnetic tape is run in one direction with the reels being driven, the informatioon data are recorded or reproduced at each group of tracks on or from the magnetic tape in the process of running the magnetic tape is one direction through the effect of the multi-track magnetic head, because a plurality of magnetic heads are provided in the multi-track magnetic head with which the magnetic tape comes into contact. Then, when the magnetic tape is wound on one reel, multi-track magnetic head is vertically moved for switching the tracks. After that, when the magnetic tape is run in an opposite direction, the information data are similarly recorded or reproduced on or from the different track of the magnetic tape through the effect of the multitrack magnetic head. Then, when the magnetic tape is wound on the other reel, the same operation is accomplished. Hence, the information data are recorded or reproduced on or from all the tracks of the magnetic tape in the process of moving the magnetic tape forth and back.

Next, the description will be directed to the magnetic recording and reproducing apparatus constructed according to the third aspect. This apparatus takes the same steps as the foregoing apparatuses when the information data are recorded or reproduced on or from all the tracks of the magnetic head through the effect of the multi-track magnetic head by switching the tracks as moving the magnetic tape forth and back. The different point of this apparatus is that it detects vertical snaking of the magnetic tape and vertically and minutely moves the multi-track magnetic head according to the detected result in a dynamic tracking manner. It results in moving the multi-track magnetic head as following the vertical snaking of the magnetic tape and reducing the off-track amount generated between the multi-track magnetic head and the magnetic tape.

The magnetic recording and reproducing apparatus designed according to the first aspect is constructed to allow the pair of guide rollers for pulling the magnetic tape out of the cassette to form the running path of the magnetic tape. In this apparatus, therefore, the running precision of the magnetic tape does not depend on the used cassette, so that the running precision can be set high. It is greatly significant in making the running speed of the magnetic tape faster and the capacity larger.

The magnetic recording and reproducing apparatus designed according to the second aspect is constructed to serially record or reproduce the information data on or from all the tracks of the magnetic tape at each group of tracks through the effect to the multi-track magnetic head in the process of moving the magnetic tape forth and back. Hence, the apparatus can greatly reduce substantial time required for recording and reproducing the information data on or from all the tracks of the magnetic tape and is fitted to the high-density recording of the magnetic tape. In the light of these points, it is greatly significant in making the running speed of the magnetic tape faster and the capacity of the magnetic tape larger.

The magnetic recording and reproducing apparatus designed according to the third aspect is constructed to vertically and minutely move the multi-track magnetic head according to the vertical snaking of the magnetic tape. Hence, the apparatus can substantially overcome the vertical snaking of the magnetic tape, resulting in setting the running precision of the magnetic tape quite high even if a pitch of the track is narrowed as a result of enhancing the density of the magnetic tape or the running speed of the magnetic tape is set high. It is therefore greatly significant in making the running speed of the magnetic tape faster and the capacity of the magnetic tape larger.

Further objects and advantages of the present invention will be apparent from the following description of the preferred embodiments of the invention as illustrated in the accompanying drawings.

BRIEF DESCRIPTION OF THE DRAWINGS

FIGS. 1 to 14 concern with one embodiment of a magnetic recording and reproducing apparatus in which;

FIG. 1 is a perspective view showing the inner construction of the magnetic recording and reproducing apparatus, FIG. 2 is a plan view showing the same construction shown in FIG. 1, FIG. 3 is a view showing the same construction of FIG. 2 from which a tape loading mechanism or other parts are excluded;

FIG. 4 is an expanded view showing the mechanism of a gear mounted on a gear-supporting plate, FIG. 5 is a partially-cutaway side view showing a guide roller.

FIG. 7 is a side view showing a winding angle adjusting mechanism,

FIG. 8 is a plan view showing the winding angle adjusting mechanism of FIG. 7,

FIG. 9 is a perspective view showing a dynamic tracking device,

FIG. 10 is a view showing the relation a photodiode and a magnetic tape for the purpose of describing the operation of the dynamic tracking device;

FIG. 11 is a perspective view showing a voice coil motor for describing a head position adjusting mechanism, FIG. 13 is a timing chart for describing the relation between the output signal of a photo interrupter and the state of loading the magnetic tape, FIG. 14 is a block diagram showing the circuit for controlling a running speed and tape tension of the magnetic tape, FIG. 15A is a chart showing a speed pattern for describing how the magnetic tape is controlled immediately before switching the running direction of the magnetic tape, and FIG. 15B is a chart showing the speed pattern describing how the magnetic tape is controlled immediately after switching the running direction of the magnetic tape.

DESCRIPTION OF THE PREFERRED EMBODIMENTS

Figure 1:
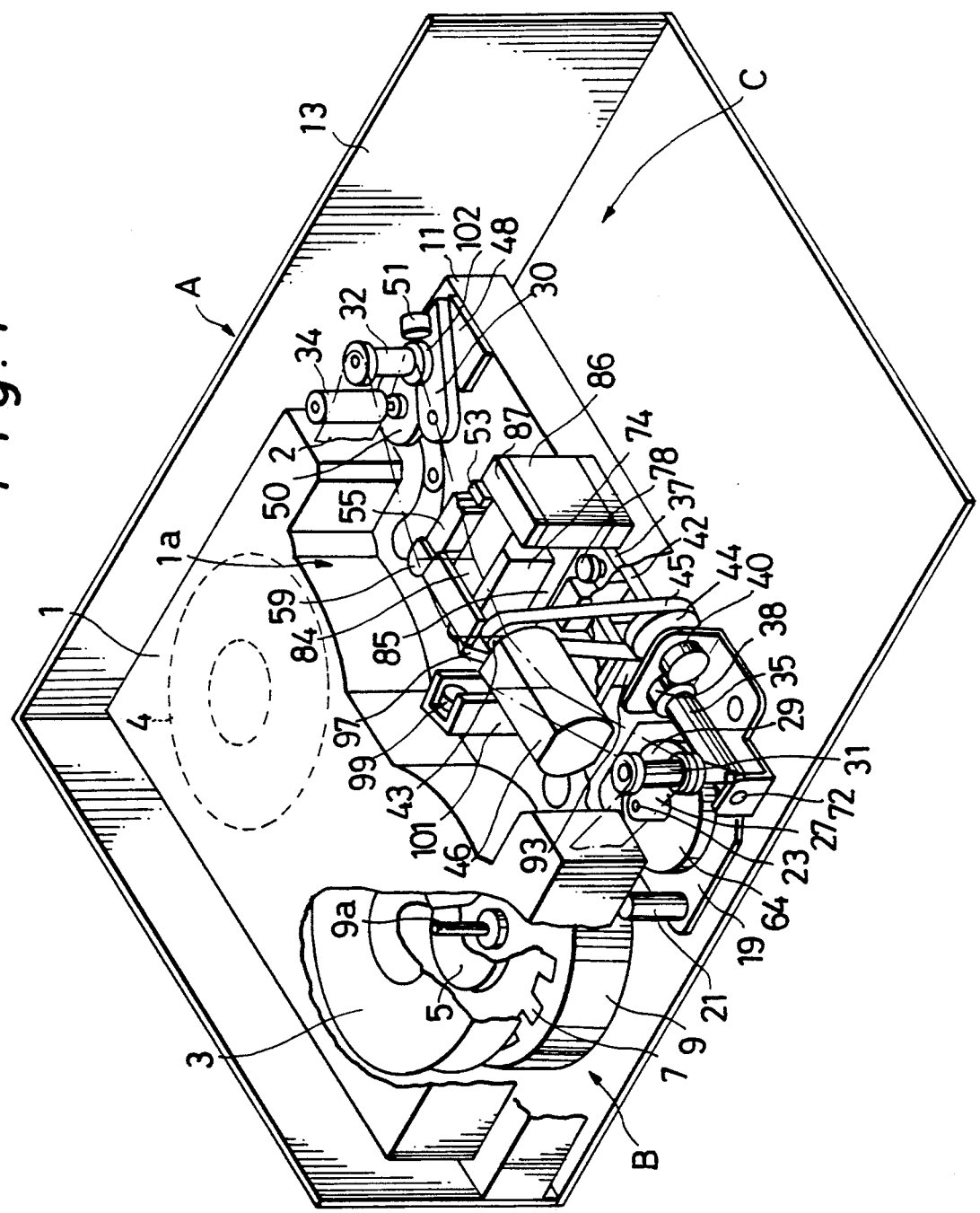
Figure 2:
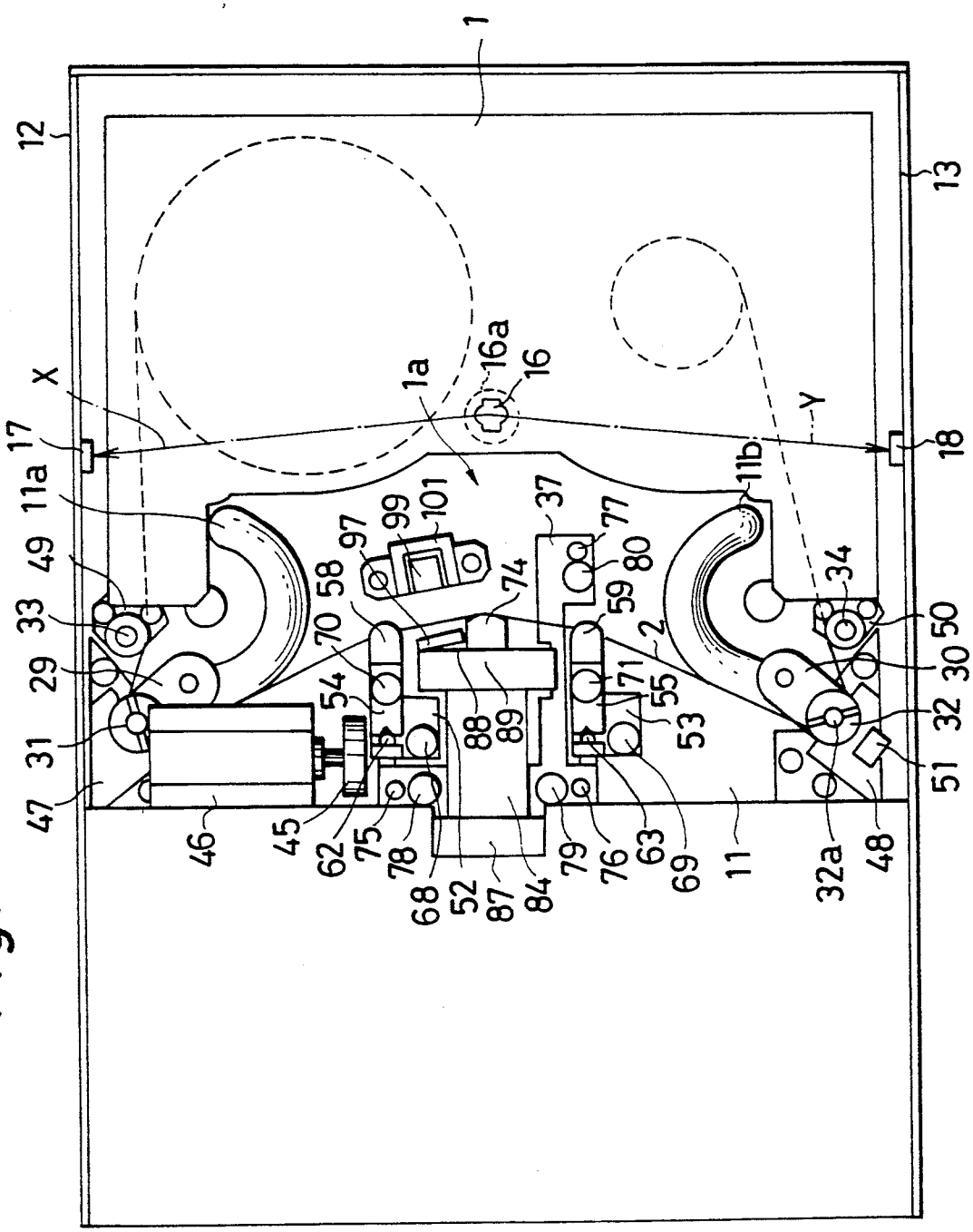
Figure 3:
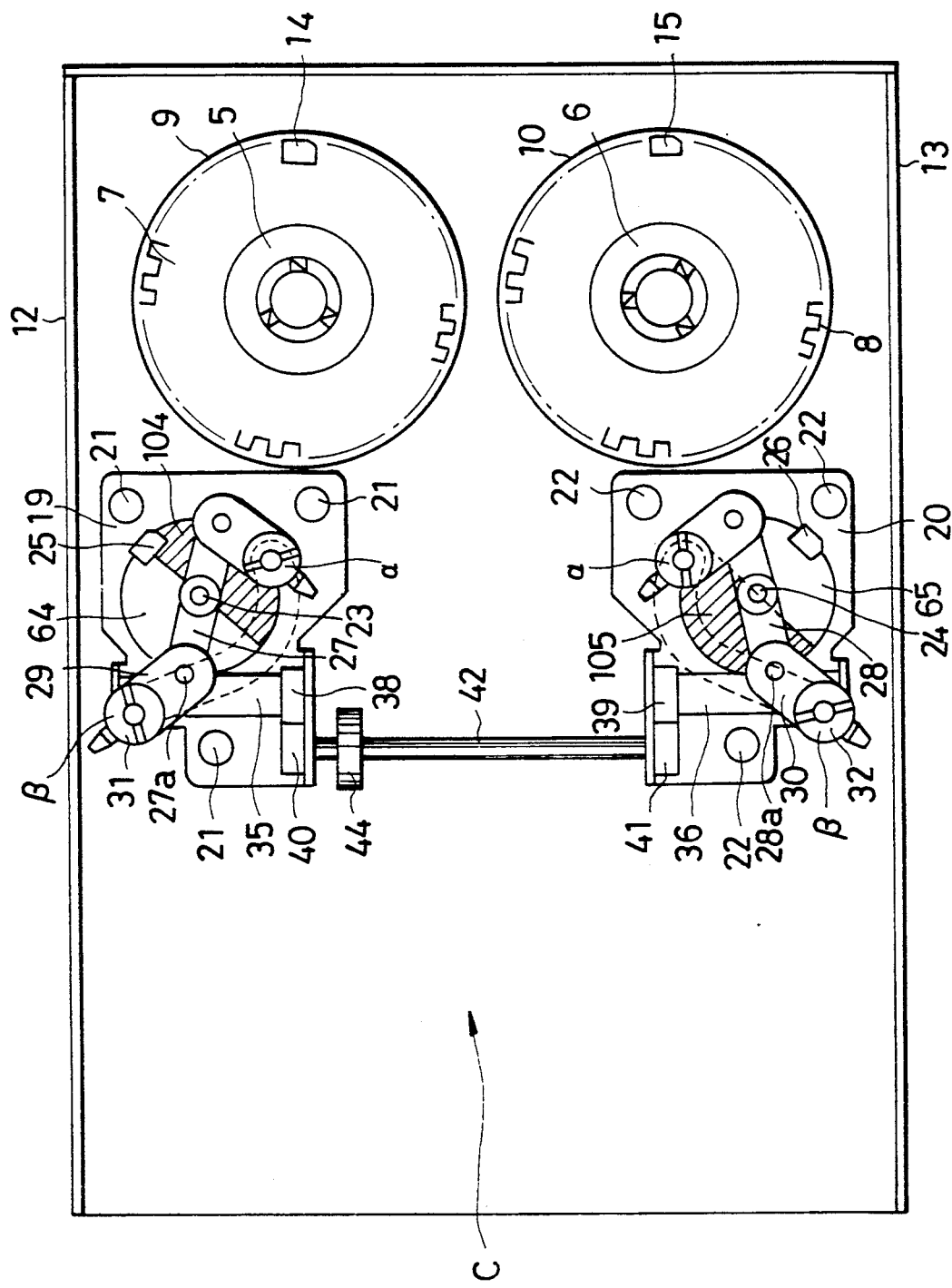
Figure 4:
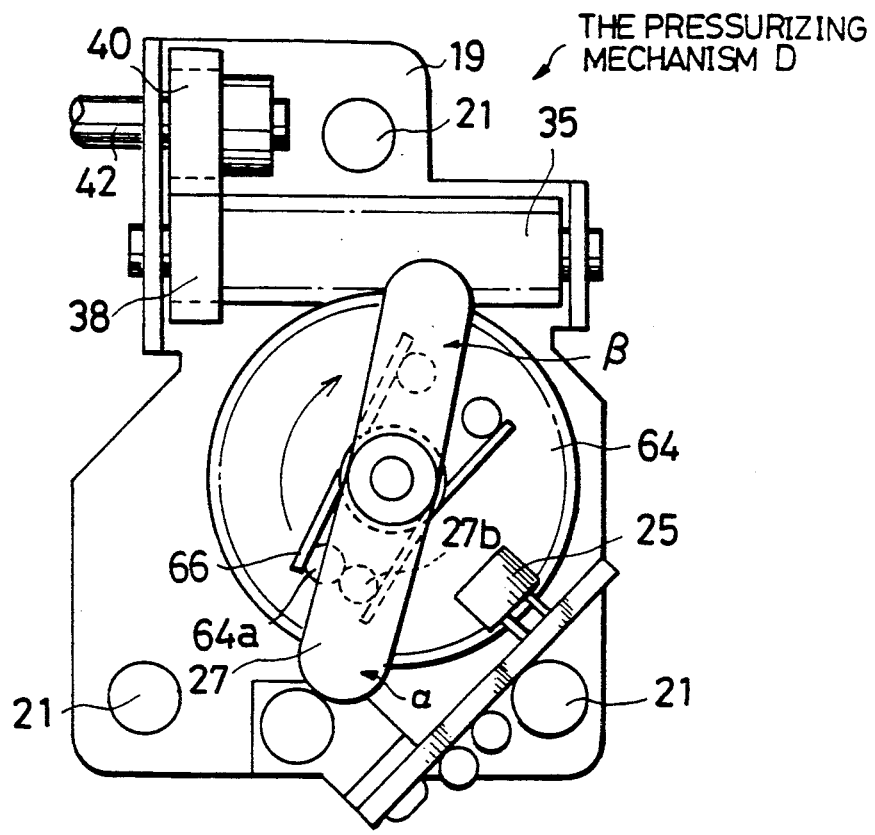
Figure 5:
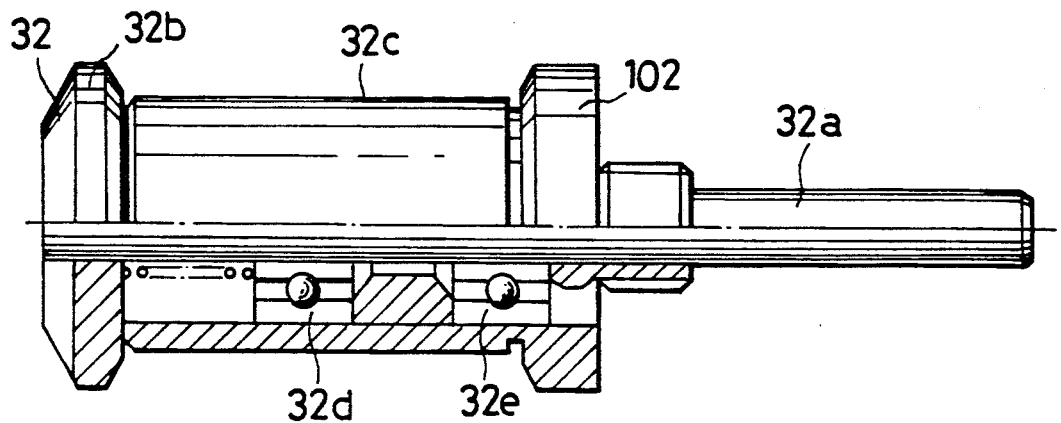

The description will be directed to a magnetic recording and reproducing apparatus constructed according to an embodiment of the invention with reference to FIGS. 1 to 5, in which FIG. 1 is a perspective view showing the inner construction of the magnetic recording and reproducing apparatus, FIG. 2 is a plan view showing the same construction shown in FIG. 1, FIG. 3 is a view showing the same construction of FIG. 2 from which a tape loading mechanism or other parts are excluded, FIG. 4 is an expanded view showing the contruction of a gear mounted on a gear supporting plate, and FIG. 5 is a partially-cutaway side view showing a guide roller.

The magnetic recording and reproducing apparatus referenced as an example herein is a data streamer for a 8-mm video cassette. It is constructed to record and reproduce a large amount of information data on and from a magnetic tape 2 contained in a 8-mm video cassette 1 as shown in FIG. 1.

A cassette automatic loading mechanism (not shown) is provided in a main body A of the apparatus. The cassette automatic loading mechanism is used for automatically loading the cassette 1 manually entered into the main body A. FIG. 2 shows the state in which the cassette 1 is loaded to the main body A. The cassette 1 has reels 3, 4 which are rotated by a cassette driving mechanism B. A main chassis 11 is fixed on side frames 12, 13 (see FIG. 2) provided on both sides of the main body A. The cassette 1 is loaded on the main chassis 11.

The cassette driving mechanism B is mounted below the main chassis 11 located at the lower position of the loaded cassette 1. The cassette driving mechanism B includes reel motors 9, 10 fixed on the main chassis 11 as main components. The reel motor 9 has an output shaft 9a linked with an FG disk 7 and a reel hub 5. The reel motor 10 has an output shaft linked with an FG disk 8 and a reel hub 6 (see FIG. 3). When the cassette 1 is loaded into the main body A, the reel hubs 5, 6 are allowed to be respectively entered into the reels 3, 4 so that the rotation driving forces of the reel motors 9, 10 are respectively transmitted to the reels 3, 4.

The FG disks 7, 8, as shown in FIG. 3, are disks, each disk on which a group of slits formed at equally-spaced pitches is located on the peripheral portion. Photo interrupters 14, 15 are respectively located in opposition to the slits. That is, each rotational speed of the FG disks 7, 8, in other words, each rotational speed of the reels 3, 4 is detected as each pulse output of the photo interrupters 14, 15.

When the cassette 1 is loaded to the main body A, as mentioned above, the reel hubs 5, 6 are respectively enters into the reels 3, 4 of the cassette 1. The cassette 1 includes a so-called cassette mouse 1a (see FIG. 1) into which guide rollers 31, 32 of a tape loading mechanism C to be described next are respectively inserted.

The tape loading mechanism C is mounted and fixed on a main chassis 11 located in opposition to the loaded cassette 1 as shown in FIG. 1 and FIG. 2. The tape loading mechanism C serves to pull the magnetic tape 2 out of the cassette mouse 1a together with the movement of the guide rollers 31, 32 (matching to a pair of guide rollers) (see FIG. 6B) and forces the pulled magnetic tape 2 to come into contact with a thin film magnetic head 74 (to be detailed later) mounted and fixed on the main chassis 11. FIG. 1 and FIG. 2 illustrates the state in which the magnetic tape 2 pulled out by the tape loading mechanism C comes into contact with the magnetic head 74.

The guide rollers 31, 32 are alternately moved between the unloading position α shown in FIG. 3 and the loading position β by the rotational driving force of a loading motor 46. Then, a mechanism located between the loading motor 46 and the guide rollers 31, 32 will be described in detail.

The loading motor 46 is fixed and supported on the main chassis 11 through a mount stay (not shown) inserted therebetween as shown in FIG. 1. The loading motor 46 has an output shaft on which a timing pulley 43 is linked with a timing pulley 44 of a driving shaft 42 through a timing belt 45. The driving shaft 42 is fitted on the lower portion of the main chassis 11. When the loading motor 46 is driven, the driving shaft 42 is forced to rotate as shown in FIG. 3. The rotation of the driving shaft 42 causes worm wheels 64, 65 to rotate in opposite directions. The rotational force is transmitted serially through gears 40, 38 and a worm 35 for the worm wheel 64 side and gears 41, 39 and a worm 36 for the worm wheel 65 side.

In FIG. 1 and FIG. 3, 19 and 20 respectively denote gear-supporting plates mounted on the lower portion of the main chassis 11 through supporting columns 21, 22. The gear-supporting plates 19, 20 keep a predetermined interval therebetween. The gear-supporting plate 19 includes the gears 40, 38, the worm 35 and the worm wheel 64 fitted thereon. The gear-supporting plate 20 includes the gears 41, 39, the worm 36 and the worm wheel 65 fitted thereon. The worm wheel 64 provides a reflection pattern 104 and the worm wheel 65 provides a reflection pattern 105 as shown in FIG. 3. These reflection patterns 104, 105 will be detailed later.

FIG. 4 is an expanded view showing the mechanism of the gear provided on the gear-supporting plate 19. The gear 40 is linked with one end of the driving shaft 42 so that the gear 40 is allowed to mate with the gear 38 mounted on the worm 35 supported in parallel to the driving shaft 42. Further, the worm 35 mates with the worm wheel 64 fitted on the driving shaft 42 in the orthogonal direction. The description of the gear mechanism provided on the gear-supporting plate 20 will be left out because it is the same as that on the gear-supporting plate 19.

The worm wheels 64, 65 are respectively fitted on supporting shafts 23, 24 pressurized and fixed on the gear-supporting plates 19, 20 as shown in FIG. 3. The worm wheels 64, 65 have the center shafts on which pulling arms 27, 28 are respectively fitted. And, a pressurizing mechanism D is provided between the worm wheel 64 and the pulling arm 27 and between the worm wheel 65 and the pulling arm 28.

The pulling arm 27, 28 respectively provide rotation shafts 27a, 28a at the tips thereof. The rotation shafts 27a, 28a respectively provide sliders 29, 30. The sliders 29, 30 also provide the guide rollers 31, 32 at the tips.

In operation, when the loading motor 46 is driven, the worm wheels 64, 65 are forced to rotate in opposite directions. The rotations are transmitted to the pulling arms 27, 28 through the pressurizing mechanisms D so that the pulling arms 27, 28 are allowed to rotate on the supporting shafts 23, 24 in opposite directions. Together with the movement of the pulling arms 27, 28, the guide rollers 31, 32 are moved from the unloading position α to the loading position β. The guide rollers 31, 32 located at the loading position β are restricted in position by catchers 47, 48 fixed on the main chassis 11 as shown in FIG. 2.

The main chassis 11 includes guide grooves 11a, 11b respectively formed along the moving paths of the rotation shafts 27a, 28a. Along the guide grooves 11a, 11b, the sliders 29, 30 and the guide rollers 31, 32 are allowed to move on the surface of the main chassis 11.

Then, the pressurizing mechanism D provided between the worm wheel 64 and the pulling arm 27 will be described with reference to FIG. 4.

A driving pin 64a is pressurized and fixed on the top surface of the worm wheel 64, while a driving pin 27b is pressurized and fixed on the lower surface of the pulling arm 27. The shaft of the pulling arm 27 has a U-like pressurizing spring 66 mounted thereon. Between both ends of the pressurizing spring 66 are located a driving pin 64a and a driving pin 27b. That is, the elastic force (assumed as initial pressure $P_o$) given by the pressurizing spring 66 serves to keep the contact between the driving pin 64a provided on the worm wheel 64 side and the driving pin 27b provided on the pulling arm 27 side. When the worm wheel 64 is rotated in this state, the pulling arm 27 is forced to rotate. Then, the guide roller 31 is caught by the catcher 47 so that it stays at the loading position β. But, the worm wheel 64 keeps continuing and then stops when it rotates by a predetermined angle. It results in releasing the driving pin 64a provided on the worm wheel 64 side from the driving pin 27b of the pulling arm 27 side and expanding the tip portion of the pressurizing spring 66, thereby increasing the elastic force effected on both the driving pins 64a and 27b (assuming the increment of the elastic force as additional pressure $\Delta P$).

The guide roller 31 moves from the unloading position α to the loading position β at which it is caught by the catcher 47. At this time, the guide roller 31 is pressurized on the catcher 47 by the pressure $P (=P_o+\Delta P)$ for positively securing it at the loading position β. The pressure P caused by the pressurizing spring 66 is set to have a far larger value than the reaction force, based on the tension of the magnetic tape 2, effected to escape the guide roller 31 from the catcher 47.

It is unnecessary to describe the pressurizing mechanism D provided between the worm wheel 65 and the pulling arm 28, because it has the same construction and function as that provided between the worm wheel 64 and the pulling arm 27.

Next, the structure of the guide roller 32 will be described with reference to FIG. 5.

The slider 30 includes a supporting shaft 32a mounted thereon (see FIG. 2). The supporting shaft 32a has an upper flange 32b and a roller 32c integrated with a lower flange fitted thereon. The upper flange 32b is pressurized and fixed on the tip portion of the supporting shaft 32a. The roller 32c having the lower flange is rotatably supported on the supporting shaft 32a through the effects of ball bearings 32d, 32e inserted between the roller 32c and the supporting shaft 32a itself. The lower flange has a reflection pattern 102 attached on the outer peripheral surface. The reflection pattern 102 is a printed black and white continuous pattern.

When the guide roller 32 stays at the loading position β, the photo interrupter 51 mounted on the catcher 32 radiates light on the reflection pattern 102. With the magnetic tape 2 running, the roller 32c and the reflection pattern 102 are forced to rotate. The reflection pattern 102 displays the various reflective states of light radiated by the photo interrupter 51. The change of quantity of light is detected by a light-receptacle portion of the photo interrupter 51 so that the photo interrupter 51 outputs a pulse signal matching to the running speed of the magnetic tape 2.

The other guide roller 31 does not have a function of detecting the running speed of the magnetic tape.

Except this function, the other guide roller 31 has the same construction and function as the guide roller 32. Hence, it is unnecessary to describe it.

Then, the description will be directed to the reflection patterns 104, 105 attached on the surfaces of the worm wheels 64, 65 with reference to FIG. 3.

Each of these reflection patterns 104, 105 is a printed black and white pattern. These reflection patterns 104, 105 are respectively attached on the surfaces of the worm wheels 64, 65. The phase difference between both reflection patterns 104 and 105 is about 90° as shown in FIG. 3. Reflective photo interrupters 25, 26 are respectively located in opposition to the reflective photo interrupters 25, 26 respectively provided on the gear-supporting plates 19, 20. The reflective photo interrupter 25 supplies an H-level detection signal when the reflection pattern 104 shows white and it supplies an L-level detection signal when the pattern 104 shows black. The reflective photo interrupter 26 performs the same operation about the reflection pattern 105.

Then, the description will be directed to the levels of the detection signals of the reflective photo interrupters 25, 26 which levels are changing according to what position the guide rollers stay at.

Figure 13:
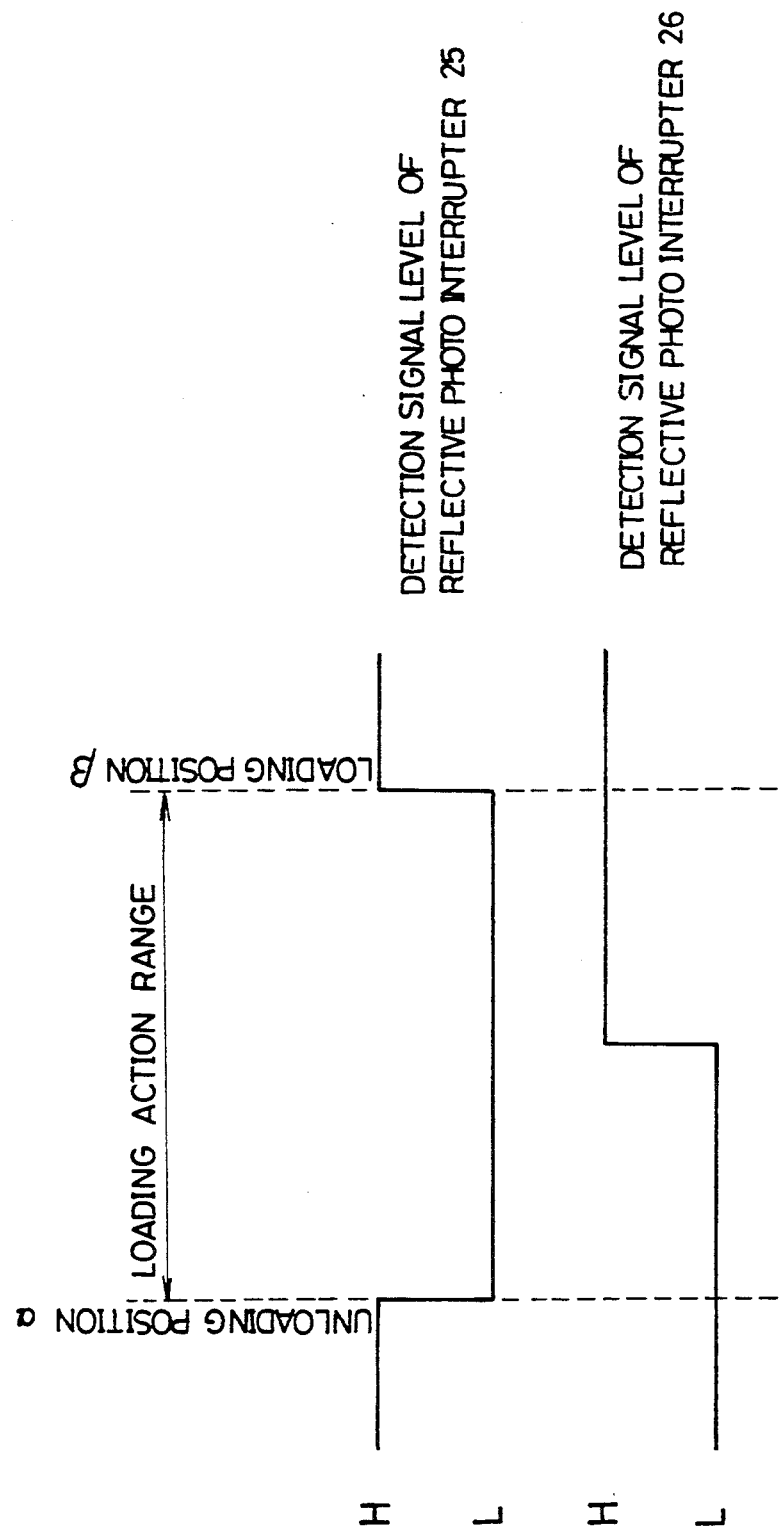

FIG. 13 is a timing chart showing how the detection signals of the reflective photo interrupters 25, 26 are changed when the guide rollers 31, 32 moves from the unloading position $\alpha$ to the loading position $\beta$. Table 1 shows the relation between each logical state of the detection signals of the reflective photo interrupters 25, 26 and each loading state of the guide rollers 31, 32.

TABLE 1

|    | Unloading | Loading Action | Loading Action | Loading |
|----|-----------|----------------|----------------|---------|
| 25 | H         | L              | L              | H       |
| 26 | L         | L              | H              | H       |

It means that the detection signals of the reflective photo interrupters 25, 26 indicate the positions of the guide rollers 31, 32. The detection signals of the reflective photo interrupters 25, 26 are sent to a central control section included in the magnetic recording and reproducing apparatus at which the positions of the guide rollers 31, 32 are constantly recognized. Hence, if a power service interruption occurs in the process of loading the guide rollers and the guide rollers 31, 32 stops on the loading process, it is possible to correctly re-start the operation after the power supply is alive.

Next, the description will be directed to how the magnetic tape 2 pulled out of the cassette 1 by the tape loading mechanism C forms a running path with reference to FIG. 1 and FIG. 2.

The magnetic tape 2 runs from the reel 3 to the reel 4 through the path of the guide rollers 33, 31, a tape guide post 56 (see FIG. 7), the magnetic head 74, a tape guide post 57 (see FIG. 7) and the guide rollers 32, 34. In case the magnetic tape 2 runs from the reels 4 to 3, the magnetic tape 2 runs through the similar path.

The guide rollers 31, 32 have been mentioned above. The tape guide posts 56, 57 match to one portion of a winding angle adjusting mechanism E (to be described later) for adjusting a winding angle of the magnetic tape 2 against the magnetic head 74. Then, the description will be directed to why the guide rollers 33, 34 are respectively provided on the main chassis 11 through guide roller platforms 49, 50 (see FIG. 2).

Figure 6A:
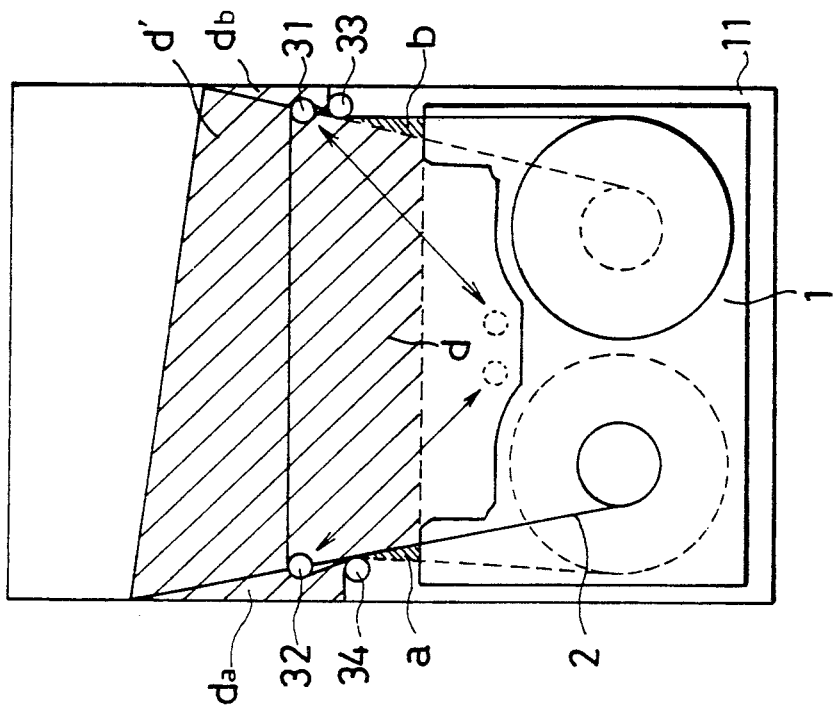
FIG. 6A is a view showing the range in which the magnetic tape can be pulled out of the cassette unless the guide rollers are provided on the tape running path.

FIG. 6A shows how extensive the magnetic tape 2 can be pulled unless the guide rollers 33, 34 are provided on the tape running path. The triangle areas shown by oblique line portions a and b match to the range in which the magnetic tape 2 is allowed to be pulled with the movement of the guide rollers 31, 32, without having to force the magnetic tape 2 to come into contact with the inner wall surface of the cassette 1. In other words, unless the tape contact surfaces of the guide rollers 31, 32 belong to the oblique line portions a and b, it means that the magnetic tape 2 comes into contact with the inner wall surface of the cassette 1. It results in defining as the oblique line portion c the range in which the magnetic tape 2 is allowed to be pulled.

The oblique line portion c greatly restricts the mount space of peripheral parts such as the magnetic head or tape guides. In order to avoid the restriction, the present magnetic recording and reproducing apparatus newly provides the guide rollers 33, 34 on the tape running path.

Figure 6B:
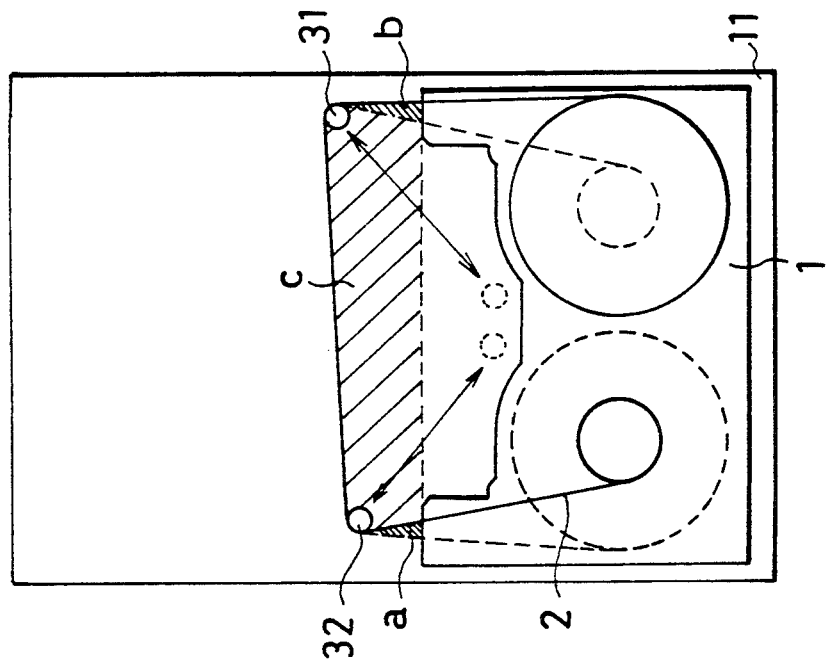
FIG. 6B is a view showing the range in which the magnetic tape can be pulled out of the cassette.

FIG. 6B shows how extensive the magnetic tape 2 is allowed to be pulled in the present apparatus. That is, the guide rollers 33, 34 are respectively provided outside of the tape running path and at the positions at which the tape surfaces being in contact with the guide rollers 33, 34 belong to the oblique line portions a and b. It results in slightly changing the tape running path of the magnetic tape 2 from the cassette 1 to the guide rollers 31, 32 and defining as an oblique line portion d the range in which the magnetic tape 2 is allowed to be pulled. However, the tape surfaces on which the guide rollers 31, 32 contact are respectively required to belong to the oblique line portions a, $d_a$ and b, $d_b$.

Recently, the guide rollers 33, 34 provide no upper and lower flanges. This is because the upper and lower flanges of the guide rollers 31, 32 adjacent to the guide rollers 33, 34 make contribution on restricting vertical snaking of the magnetic tape 2. If both the guide rollers 31, 32 and 33, 34 are designed to provide the upper and lower flanges, it results in substantially enhancing flexural rigidity of the magnetic tape 2 which runs between the guide rollers 31, 32 and 33, 34 so that the upper and lower edges of the magnetic tape 2 may be more damaged, because both groups of guide rollers are located close to each other.

Figure 7:
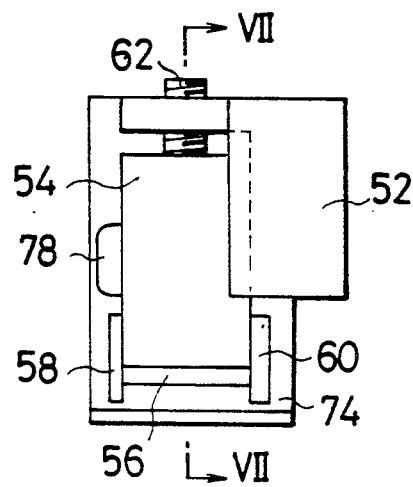
Figure 8:
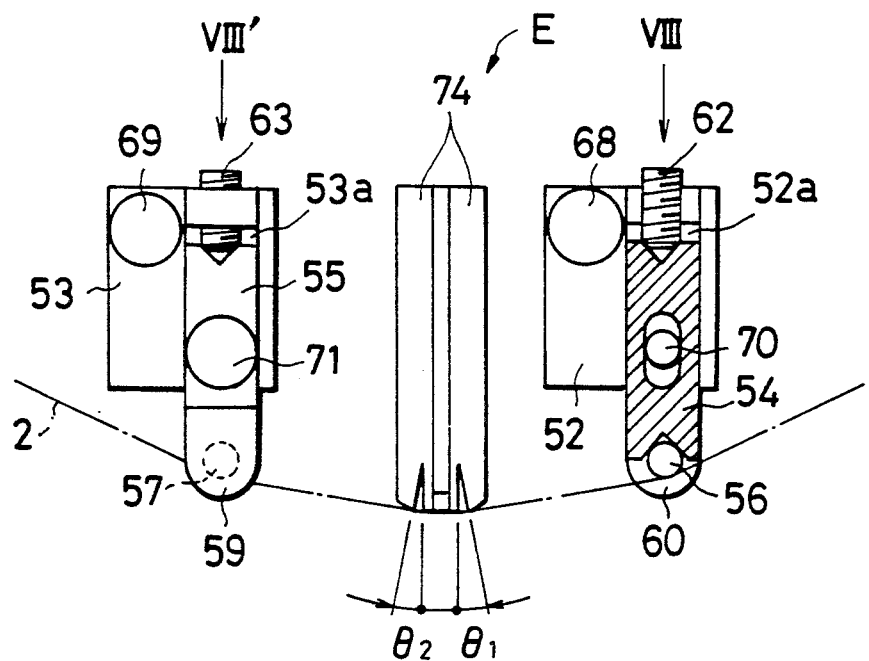

Next, the description will be directed to the winding angle adjusting mechanism E located on both sides of the magnetic head 74 with reference to FIG. 7 and FIG. 8, in which FIG. 7 is a plan view showing the winding angle adjusting mechanism E and FIG. 8 is a side view showing the winding angle adjusting mechanism E together with the sectional view of the VII—VII line of FIG. 7.

Tape guide bases 52, 53 are respectively mounted and fixed on both sides of the magnetic head 74 located on the main chassis 11 with screws 68, 69. The tape guide bases 52, 53 each consists of a substantially L-like block. The tape guide bases 52, 53 include on the top surface guide grooves 52a, 53a used for sliding tape guide blocks 54, 55 in parallel to the magnetic head 74 (in the VIII and VIII' directions in FIG. 8). On the opposite tape side surfaces of the tape guide bases 52, 53 are respectively provided adjusting screws 62, 63 for adjusting the sliding amount of the tape guide blocks 54, 55. And, the guide grooves 52a, 53a respectively provide screw holes (not shown) into which screws 70, 71 are entered for positioning the slidable tape guide blocks 54, 55.

The tape guide blocks 54, 55 include the upper flanges 58, 59 and the lower flanges 60, 61 (61 is not shown) attached and fixed at the upper and lower portions of the tips of the blocks 54, 55. The tape guide posts 56, 57 are respectively fitted between the upper flanges 58, 59 and the lower flanges 60, 61.

In operation, when the adjusting screws 62, 63 are respectively rotated in the state of releasing the screws 70, 71, the tape guide blocks 54, 55 are moved in the directions VIII and VIII' shown in FIG. 8. With the movement, the contact between the magnetic tape 2 and the tape guide post 56, 57 at both sides of the magnetic head 74 is gradually made variable. Hence, by rotating the adjusting screws 62, 63, it is possible to easily adjust the winding angles $\theta_1$ and $\theta_2$ of the magnetic tape 2 against the magnetic head 74 in the range of about 10° to 15°. When the adjustment of the winding angles $\theta_1$ and $\theta_2$ finishes, by fastening the screws 70 and 71, the tape guide blocks 54, 55 are secured in position. It results in keeping the winding angle of the magnetic tape 2 against the magnetic head 74 in a desired state.

Each interval between the flanges 58, 59 and the lower flanges 60, 61 is set to have a larger value than the width of the magnetic tape 2 by several tens micrometers. It results in being able to reduce the damage of the upper and lower tape edges of the magnetic tape 2 running in contact with the magnetic head 74 and suppressing the vertical variation of the magnetic tape 2 to about several tens micrometers.

As the magnetic tape 2 keeps higher density and larger capacity of the information data recorded thereon, the track pitch recorded on the magnetic tape 2 is made as narrow as about 50 micrometers, though the track pitch is currently one hundred and several tens micrometers. Such a narrow track pitch requires an allowable off-track length of ten or less micrometers. The allowable off-track length means the length by which the tape is theoretically allowed to shift. In actual, however, the present magnetic recording and reproducing apparatus has some difficulty in suppressing the vertical variation of the magnetic tape 2 within the range of ten micrometers. For overcoming the difficulty, the present apparatus provides a dynamic tracking device F which has a function of suppressing the vertical variation of the magnetic tape 2 even if it is about several tens micrometers.

Figure 9:
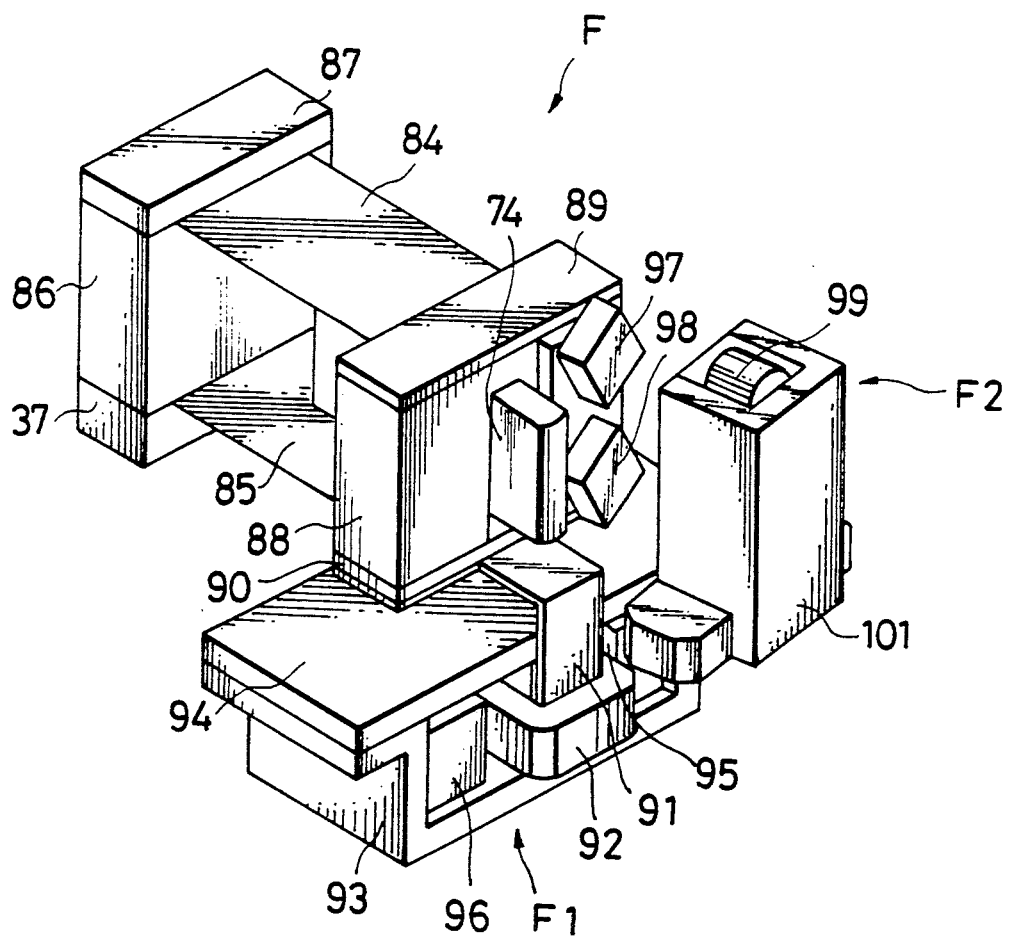
Figure 10:
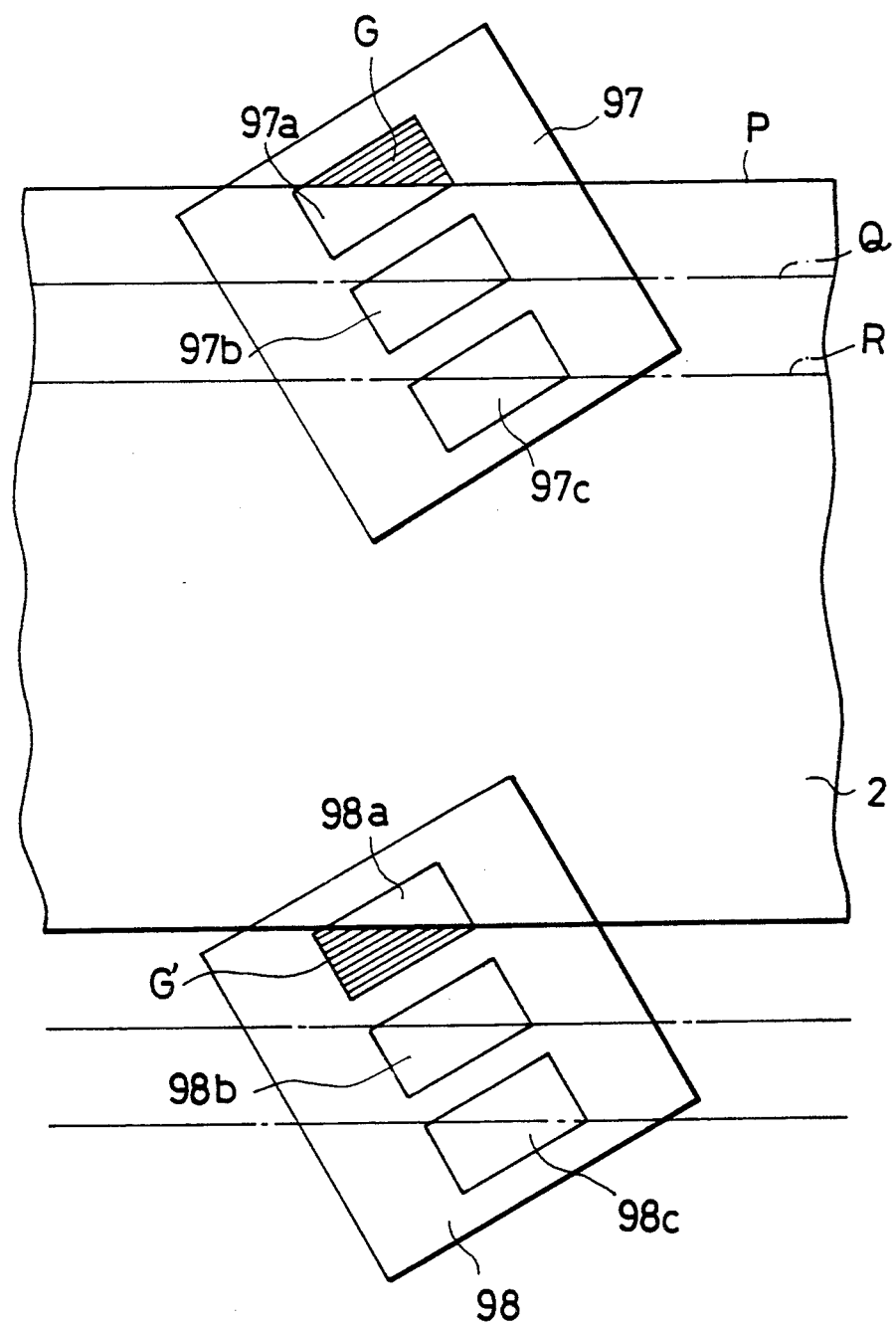

FIG. 9 is a perspective view showing the dynamic tracking device F. FIG. 10 is a view for describing the operation of the dynamic tracking device F, in which the relation between the magnetic tape 2 and the photodiodes 97, 98 is indicated.

The dynamic tracking device F is a device in which for magnetically recording and reproducing the information data, the magnetic head follows the vertical snaking of the magnetic tape having an amplitude of several tens micrometers or less caused when the magnetic tape runs. It is purposed to reduce the off-track length as much as possible.

A track switching method means a method in which for switching the track, the magnetic head is vertically moved in a stepwise manner at each track pitch (one hundred and several tens micrometers) based on the serpentine recording system.

The present recording and reproducing apparatus uses a moving device for vertically moving the magnetic head 74 for both of the dynamic tracking and the track switching. It means that one moving device matches to these two operations. This moving device is described as a dynamic tracking device F for the convenience's sake.

The dynamic tracking device F employs a voice coil motor F1. It moves the magnetic head 74 vertically against the magnetic tape 2 based on the serpentine recording system employed in the present apparatus, and at a time it can move the magnetic head 74 as following the vertical variation of the running magnetic tape 2.

The magnetic head 74 (matching to the multi-track magnetic head) employed in the present apparatus has a head structure wherein a plurality of thin film magnetic heads (tracks) are located at predetermined intervals in the vertical direction. These thin film magnetic heads are easily made to be multi-track. The number of thin film magnetic heads are set to be the number produced by dividing by an integer the track numbers standardized as a track format on the magnetic tape 2.

At first, a movable unit of the voice coil motor F1 will be described.

On the main chassis 11 matching to the lower limit of the magnetic head 74, there is provided a magnetic head platform 37 on which a head position adjusting mechanism F3 (not shown in FIG. 9) is mounted. On the top of the magnetic head platform 37 is provided a flat spring fixing block 86. One end of a flat spring 85 is inserted between the magnetic head platform 37 and the flat spring fixing block 86. On the top of the flat spring block 86 is provided a flat spring pressing plate 87. One end of the flat spring 84 is inserted between the flat spring fixing block 86 and the flat spring pressing plate 87. And, the other ends of the flat springs 84 and 85 spaced from each other are connected to one end of a magnetic head fixing block 88. On the other end of the magnetic head fixing block 88 are mounted the photodiodes 97, 98 (to be described later) and the magnetic head 74. 89 and 90 denote flat spring pressing plates. A frame-like bobbin 91 is mounted on the central portion of the lower surface of the flat spring pressing plate 90. The bobbin 91 provides a coil 92 at the lower end portion. The coil 92 is influenced by a magnetic flux generated by a fixing unit of the voice coil motor F1 (to be described later).

The fixing unit of the voice coil motor F1 consists of a yoke 93 having a concave section and a flat yoke 94 located at the lower site of the magnetic head 74. The yoke 93 and the flat yoke 94 are made of magnetic materials. The yoke 93 is fixed on the main chassis 11, while the yoke 94 is fixed and mounted on the top of the yoke 93. On the concave bottom surface of the yoke 93 are provided permanent magnets 95, 96 spaced from each other.

The movable unit of the voice coil motor F1 includes the coil 92 located between the permanent magnets 95, 96 so that the coil 92 is influenced by the magnetic flux generated by the permanent magnets 95, 96. The bobbin 91 linking the coil 92 with the magnetic head fixing block 88 is allowed to vertically move in the state wherein the opening yoke 94 enters into the hollow portion of the bobbin 91 from the side of the bobbin 91.

When current flows through the coil 92 which is subject to the magnetic flux generated by the permanent magnets 95, 96, the coil 92 is influenced by the electromagnetic force corresponding to the direction and the magnitude of the current. The effect of the electromagnetic force causes the magnetic head fixing block 88, in other words, the magnetic head 71 to vertically move.

The voice coil motor F1 has the construction mentioned above. The current given to the coil 92 is generated in the central control section of the dynamic tracking device F. Then, a magnetic head position detecting section F2 included in the central control section will be described.

A housing 101 having a concave section is mounted and fixed on the main chassis 11 matching to the inside of the cassette mouse 1a. The housing 101 includes a light-emitting diodes 99, 100 for radiating light to the photodiodes 97, 98 inside of itself. The light-emitting diodes 99, 100 respectively provide collimator lens on the luminous surfaces thereof.

The photodiode 97 consists of three photodiodes 97a, 97b, 97c as shown in FIG. 10. The photodiode 97 is mounted so that the center of the photodiode 97 substantially matches to an upper edge of the magnetic tape 2 in the state wherein the voice coil motor F1 does not move. The photodiodes 97a, 97b, 97c each can supply an analogue signal corresponding to the quantity of a light flux received from the light-emitting diode 99 without being screened by the magnetic tape 2. The other photodiode 98 has the same arrangement and function as the photodiode 97 except that the central portion of the photodiode 98 is set to substantially match to the lower edge of the magnetic tape 2.

The photodiodes 97, 98 supply the output signals to the central control section. The output signals indicate where the magnetic head 74 is located against the magnetic tape 2, Next, the description will be directed to the operation of the dynamic tracking device F. FIG. 10 shows the relative positional relations between the magnetic tape 2 and the photodiodes 97, 98 as positions P, Q, R. For the convenience of explanation, the three moving positions of the magnetic head 74 to be vertically moved against the magnetic tape 2 are represented as the positions P, Q and R.

When the central control section gives an instruction for controlling the magnetic head 74 to go to the position P, the voice coil motor F1 performs the servo operation based on a deviation signal produced by subtracting the output signal of the photodiode 97a from that of the photodiode 98a. That is, the voice coil motor F1 operates to keep the light-receptacle area (shown by G in FIG. 10) of the photodiode 97a for receiving a light flux radiated by the light-emitting diode 99 equal to the light-receptacle area of the photodiode 98a radiated by the light-emitting diode 98a (shown by G' in FIG. 10). Hence, the magnetic head 74 is allowed to move as following the vertical variation of the running magnetic tape 2 so that the magnetic head 74 is stopped at the position P.

When the central control section gives an instruction for moving the magnetic head 74 from the position P to the position Q, the voice coil motor F1 operates to maximize (minimize) the output levels of the photodiodes 97a, 98a for slightly moving the magnetic head 74 upward. Then, the voice coil motor F1 is servo-operated on a deviation signal produced by subtracting the output signal of the photodiode 97b from that of the photodiode 98b. Like the foregoing instruction, hence, the magnetic head 74 is allowed to move to the position Q as following the vertical variation of the running magnetic tape 2.

When the central control section gives an instruction for moving the magnetic head 74 from the position Q to the position R, the voice coil motor F1 operates to maximize (or minimize) the output levels of the photodiodes 97b, 98b for slightly moving the magnetic head 74 upward. Then, the voice coil motor F1 is servo-operated on a deviation signal produced by subtracting the output signal of the photodiode 97c from that of the photodiode 98c. Like the foregoing instruction, hence, the magnetic head 74 is allowed to move to the position R as following the vertical variation of the running magnetic tape 2. For changing the position R to the position P, it is necessary to perform the reverse process to that mentioned above.

Figure 11:
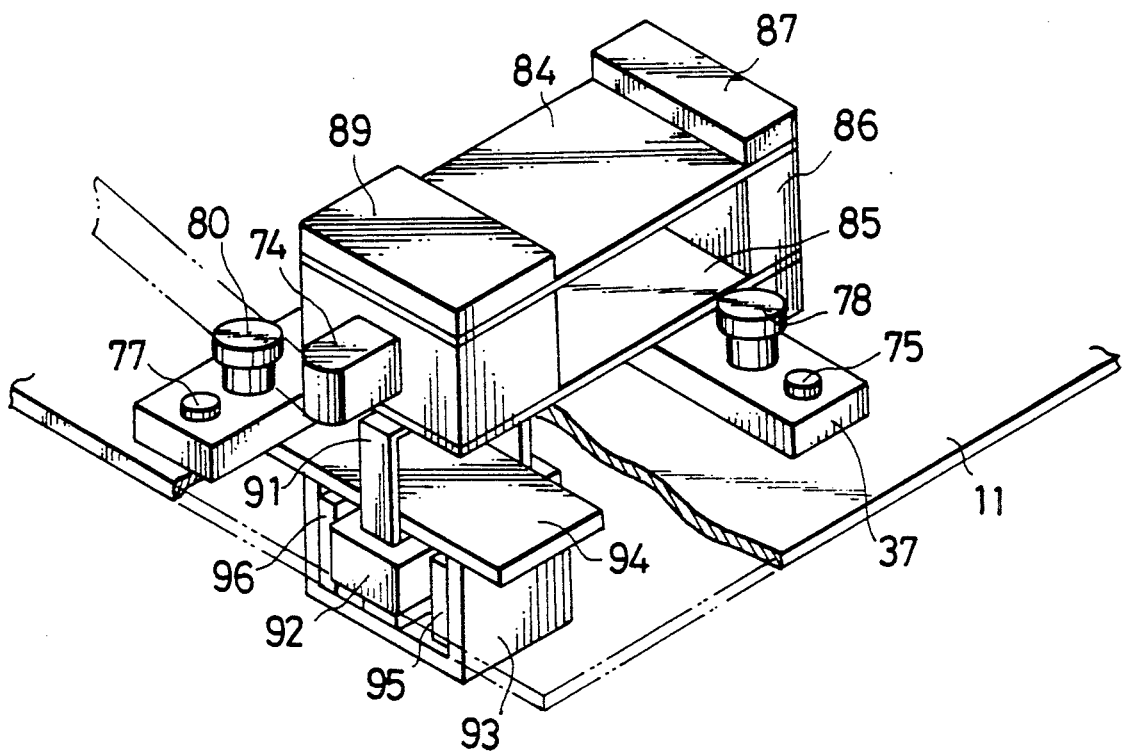
Figure 12A:
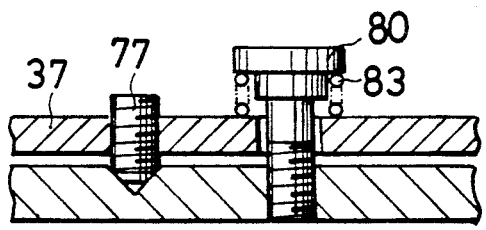
FIG. 12A is a sectional view showing a platform of a magnetic head.
Figure 12B:
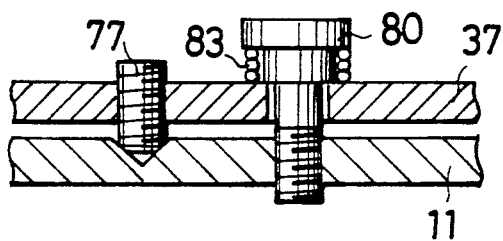
FIG. 12B is another sectional view showing the platform shown in FIG. 12A.

Then, the description will be directed to the head position adjusting mechanism F3 with reference to FIG. 11, FIG. 12A and FIG. 12B.

The head position adjusting mechanism F3 is provided in the dynamic tracking device F' for simply adjusting azimuth, zenith and a reference height of the magnetic head 74.

The magnetic head platform 37 for supporting the moving unit of the voice coil motor F1 is formed to be like an L as shown in FIGS. 2 and 11. The magnetic head platform 37 is mounted and supported on the main chassis 11. The mounting and supporting requires adjusting screws 75, 76, 77 and screws 78, 79, 80, which are located on the magnetic head platform 37 so as to keep them orthogonal to the length of the flat springs 84, 85. The base ends of the adjusting screws 75, 76, 77 are screwed on the main chassis 11. The tip portions of the adjusting screws 75, 76, 77 come into contact with the concave portions formed at predetermined positions of the main chassis 11. The base ends of the screws 78, 79, 80 are allowed to pass through the openings formed at predetermined positions of the magnetic head platform 37. The tip portions of the screws 78, 79, 80 are screwed into screw holes formed on the main chassis 11. Further, between the heads of the screws 78, 79, 80 and the magnetic head platform 37 are respectively inserted compression coil springs 81, 82, 83 (not shown in FIG. 11, FIG. 12A and FIG. 12B) which are forced to be compressed. FIGS. 12A and 12B are side views showing the portion of the magnetic head platform 37 in which the adjusting screw 77 and the screw 80 are mounted. Each compression coil spring 81, 82, 83 is designed to provide the proper number of windings, the overall length of which does not reach the compressed length of the coil springs 81, 82, 83.

As is understood from the above description, the zenith adjustment of the magnetic head 74 can be performed by adjusting the adjusting screw 77 and the azimuth adjustment of the magnetic head 74 can be performed by adjusting the adjusting screw 75. These adjustments are allowed to be performed independently. Further, by rotating the adjusting screws 75, 76, 77 more by a rotational angle in the same direction, it is possible to adjust the reference height of the magnetic head 74. When these adjustments finish, by fastening the screws 78, 79, 80, the magnetic head platform 37 is positively secured on the main chassis 11.

On the magnetic head platform 37 is placed the moving unit of the voice coil motor F1 which is a source for generating vibrations. It is therefore necessary to set the proper oscillation number as high as possible. For meeting the necessity, by fastening the screws 78, 79, 80 when the adjustments finish, it is possible to enhance the number of proper oscillations caused on the magnetic head platform.

Figure 14:
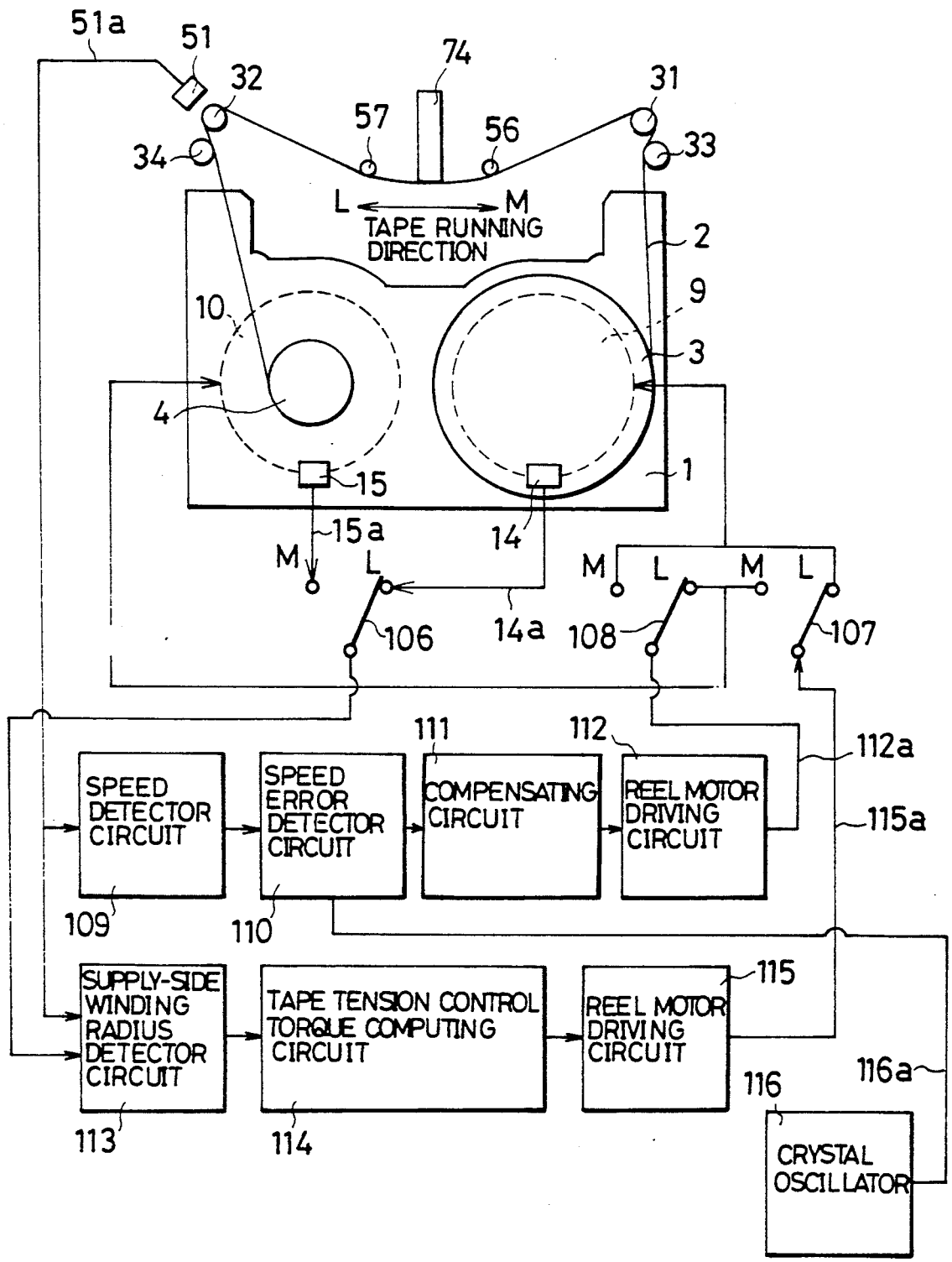

Next, the description will be directed to the circuit arrangement of the control system for controlling the running speed of the magnetic tape 2 and the tape tension with reference to FIG. 14 and Table 2. The control system is included in the central control section of the magnetic recording and reproducing apparatus. In FIG. 14, L and M represents the direction of the tape running.

TABLE 2

|   | Reel 3 | Reel 4 |
|---|---|---|
| L | Supply | Take-up |
| M | Take-up | Supply |

The followings are shown in Table 2. When the magnetic tape runs in the direction L, the reel 3 serves as a supply reel and the reel 4 serves as a take-up reel. When the magnetic tape runs in the direction M, the reel 3 serves as a take-up reel and the reel 4 serves as a supply reel.

At first, the control system of the running speed of the magnetic tape 2 will be described.

The FG signal 51a output by the photo interrupter 51 indicates a rotation period (substituted as $T_E$) of the roller 32c included in the guide roller 32. The FG signal 51a is sent to a speed detector circuit 109.

The speed detector circuit 109 is arranged to compute a running speed (substituted as v) of the magnetic tape 2 based on the following equation;

$$v = 2\pi R_E/T_E \quad (1)$$

where $R_E$ denotes a radius of the roller 32c.

The computed result is sent to a speed error detector circuit 110.

The speed error detector circuit 110 is arranged to substract the speed reference data of the magnetic tape 2 indicated by the output signal 116a of the crystal oscillator 116 from the data about the actual running speed of the magnetic tape 2 indicated by the output signal of the speed detector circuit 109. The subtracted result, that is, the data about a deviation speed is sent to a reel motor driving circuit 112 through a compensating circuit 111. The compensating circuit 111 is a phase-compensating circuit for keeping the speed control system stable.

The reel motor driving circuit 112 is a driver circuit which generates a voltage used to drive the reel motors 9, 10 based on the deviation speed data processed in the compensating circuit 111. A switch 108 is provided between the reel motor driving circuit 112 and the reel motors 9, 10. The switch 108 is used for switching the tape running direction.

In FIG. 14, L and M indicated at the switch 108 respectively match to the tape running directions L and M. This is true to the switches 106 and 107 (to be described later).

When the switch 108 is turned to the contact L, the output voltage of the reel motor driving circuit 112 is supplied to the reel motor 10 so that the powered reel motor 10 operates to allow the reel 4 to take up the magnetic tape 2 wound on the reel 3. On the other hand, when the switch 108 is turned to the contact M, the output voltage of the reel motor driving circuit 112 is supplied to the reel motor 9 so that the powered reel motor 9 operates to allow the reel 3 to take up the magnetic tape 2 wound on the reel 4.

The closed-loop speed control system having the foregoing arrangement serves to keep the magnetic tape 2 running at the reference speed.

Next, the description will be directed to the control system for keeping the tape tension applied between the magnetic tape 2 and the magnetic head 74 constant.

The photo interrupters 14, 15 respectively supply the FG signals 14a, 15a containing the data about the rotation periods of the reels 3, 4 (substituted as $T_s$). These FG signals 14a, 15a are supplied to a supply-side winding diameter detector circuit 113 through the switch 106. And, as mentioned above, the FG signal 51a of the photo interrupter 51 contains the data about the rotation period $T_E$ of the roller 32c included in the guide roller 32. The FG signal 51a is sent to the speed detector circuit 109 as well as the supply-side winding diameter detector circuit 113.

The supply-side winding diameter detector circuit 113 is arranged to computer a tape winding radius (substituted as $R_s$) of the reel 3 when the magnetic tape runs in the direction L and the tape winding radius $R_s$ of the reel 4 when the magnetic tape runs in the direction M.

The relation among the rotation period $T_s$ of the reel 3, 4, the tape winding radius $R_s$ and the running speed v of the magnetic tape 2 can be indicated by the following equation;

$$v = 2\pi R_s/T_s \quad (2)$$

By eliminating v from both of the equations (1) and (2), the following result appears;

$$R_s = R_E \cdot T_s/T_E \quad (3)$$

As is understood from the above description, the supply-side radius detector circuit 113 receives the data $T_s$ and $T_E$ and the roller radius $R_E$ of the reel 3 or 4 has a known constant. Hence, it is possible to compute the tape winding radius $R_s$ of the reel 3 or 4 based on the equation (3). The computed result is sent to a tape tension control torque computing circuit 114.

The tape tension control torque computing circuit 114 is arranged to compute a reel-driving torque (substituted as $M_s$) required for keeping the tape tension (substituted as $F_T$) predetermined on the data of the tape winding radius $R_s$. This computation is based on the following equation;

$$M_s = F_T \cdot R_s - M_o \quad (4)$$

where $M_o$ denotes torque loss caused by the resistance of the bearing or some parts.

Though this equation is a relation equation in the normal state, the use of the equation makes it possible to compute the reel-driving torque $M_s$ by using the predetermined data of the tape tension $F_T$ and $M_o$ and the tape winding radius $R_s$ obtained by the equation (3). The computed result is sent to a reel motor driving circuit 115 which generates the current required for obtaining the reel-driving torque $M_s$ and supplies the current to the reel motors 9, 10 through the switch 107.

That is, when the magnetic tape runs in the direction L, the switch 107 is turned to the contact L. The output current 115a of the reel motor driving circuit 115 is supplied to the reel motor 9 so that the reel motor 9 produces a back torque. When the magnetic tape runs in the direction M, the switch 107 is turned to the contact M. The output current 115a of the reel motor driving circuit 115 is supplied to the reel motor 10 so that the reel motor 10 produces a back torque.

The tape tension control system having the foregoing arrangement is capable of controlling the tape tension applied on the magnetic tape 2 to be the value of $F_T$ independently of the tape running directions and controlling the running speed of the magnetic tape 2. It results in being able to keep the magnetic tape 2 running stably.

Next, the description will be directed to how to control the reel motors 9, 10 when the magnetic tape 2 changes its running direction.

Before describing the control method, how to detect the finish of the tape winding will be described with reference to FIG. 2.

On the main chassis 11 are located a two-light-flux type light-emitting diode 16 for radiating two light fluxes X and Y as shown in FIG. 2. The light-emitting diode 16 radiates the light flux X to the photo diode 17 fixed on the side frame 12 and the light flux Y to the photo diode 18 fixed on the side frame 13. And, the two-light-flux type light-emitting diode 16 is inserted into a light-emitting diode insertion hole 16a provided in the cassette 1 when the cassette 1 loaded into the apparatus, resulting in entering the light-emitting diode 16 into the inside of the cassette 1. The light fluxes X and Y are screened by the magnetic tape 2 when the magnetic tape 2 is running. However, when the overall magnetic tape 2 is taken up on either one of the reels 3 and 4, either one of the light flux X and Y proceeds to either one of the photo diodes 17, 18 through a transparent leader tape and a hole (not shown) formed on the side of the cassette 1. In the example shown in FIG. 2, the magnetic tape 2 is taken up on the reel 3 so that the light flux Y is received by the photo diode 18, while the light flux X is screened by the magnetic tape 2 until it reaches the photo diode 17.

The output signals of the photo diodes 17, 18 are sent to the central control section included in the magnetic recording and reproducing apparatus. In the central control section, by checking the change of the signal levels of the output signals, it is possible to recognize the winding end of the magnetic tape 2 against the reels 3, 4 independently of the tape running directions.

The normal method for detecting the winding end of the magnetic tape 2 employs the leader tape. This method, however, has the following disadvantage if the running speed (2 to 3 m/sec) of the magnetic tape 2 is set quite high. The disadvantage is that since the length of the leader tape is quite shorter than the overall length of the magnetic tape 2, it is impossible to abruptly stop the reel motors 9, 10 on the timing when the output signals of the photo diodes 17, 18 change, resulting in the abrupt change of tension damaging the magnetic tape 2.

To overcome the disadvantage, the present magnetic recording and reproducing apparatus is designed to control the reel motors 9, 10 based on the speed patterns shown in FIG. 15A or FIG. 15B before or after the magnetic tape running direction is switched.

Next, the description will be directed to the process of switching the magnetic tape running direction from M to L after the magnetic tape 2 running in the direction M is taken up on the reel 3.

When the tape winding radius $R_s$ of the reel 4 computed by the supply-side radius detector circuit 113 is reduced to the predetermined winding radius, the running speed of the magnetic tape 2 gradually drops from the high speed value. It results in reducing the running speed of the magnetic tape 2 and changing the running speed to the low speed set value when the speed reaches out of the range in which the tape-speed or tape-tension servo function is effective. Hence, the reel motor 9 receives a power supply matches to the low speed set value. Then, when the start end of the leader tape of the magnetic tape 2 is detected by the output signal of the photo diode 18, the reel motor 9 is stopped. For reducing the running speed of the magnetic tape 2 from the high speed set value to the low speed set value, the decelerating gradient and the proper winding radius are pre-set for avoiding the generation of abrupt tension variation in deceleration.

Next, the tape running direction is switched from M to L when the magnetic tape 2 stops. Then the magnetic tape 2 is accelerated to the lower limit speed at which the tape-speed or tape-tension servo function is effective. The acceleration is based on such an accelerating gradient as avoiding the generation of abrupt tension variation. When the running speed of the magnetic tape 2 reaches the range in which the tape-speed or tape-tension servo function is effective, the servo operation is turned on and then the running speed of the magnetic tape 2 is pulled into the high speed set value.

The foregoing control method makes it possible to smoothly and stably run the magnetic tape 2 back and forth.

Next, the overall operation of the present apparatus will be described.

When the cassette 1 is loaded to the main body A, the tape loading mechanism C is operated so that the guide rollers 31, 32 move from the unloading position α to the loading position β. With the movement, the magnetic tape 2 is pulled out of the cassette 1. Then, the guide rollers 31, 32 are positioned at the loading position β, resulting in forming the running path.

And, the dynamic tracking device F is operated so that the magnetic head 74 is moved to the position P. In this state, the magnetic tape 2 runs in the direction L as keeping the speed and tape tension constant, when the data is recorded or reproduced at each group of tracks on or from the magnetic tape 2 through the magnetic head 74. When the magnetic tape 2 is forced to run in the direction M after the overall magnetic tape 2 of the reel 3 is taken up on the reel 4, the information data are similarly recorded or reproduced at the next track on the magnetic tape 2 through the magnetic head 74.

Then, when the overall magnetic tape 2 wound on the reel 4 is taken up on the reel 3, the magnetic tape 2 is forced to run in the direction L and the dynamic tracking device F is operated so that the magnetic head 74 is moved to the position Q. It results in recording or reproducing the information data at the next track on or from the magnetic tape 2 through the magnetic head 74 in a similar manner. After the process is repeated, recording or reproducion of the information data stored at all the tracks on the magnetic tape 2 has finished. Then, the tape loading mechanism C is operated so that the reel motors 9, 10 yield slight back tension and the guide rollers 31, 32 are moved from the loading position β to the unloading position α. It results in allowing the pulled magnetic tape 2 to be accommodated in the cassette 1.

The present magnetic recording and reproducing apparatus having the foregoing arrangement is capable of allowing the running precision of the magnetic tape 2 to be kept independently of the cassette 1 and substantially suppressing vertical snaking caused in running the magnetic tape 2 for realizing the tape running with high precision. Further, the use of the dynamic tracking device F makes it possible to greatly reduce the substantial time required for recording or reproducing the information data at all the tracks on or from the magnetic tape 2. Hence, it makes great contribution to keeping the density of the magnetic tape 2 higher and is greatly significant in keeping the speed and the capacity of the apparatus higher and larger. As a result, the present magnetic recording and producing apparatus can implement the function of transferring the larger capacity of data at the higher speed than the traditional apparatus.

The present invention is arranged to vertically move the magnetic head 74 for the serpentine recording with the dynamic tracking device F mainly consisting of the single voice coil motor F1. And, the apparatus uses not a special speed detector like a rotary encoder but the existing components for detecting the running speed of the magnetic tape 2. It is beneficial to keep the apparatus smaller in size and less costly.

Further, the present apparatus is arranged to detect vertical snaking caused in running the magnetic tape 2 with a non-contact optical means. It provides some advantages such as no requirement of the special servo-leased track and no influence given by the dropout of the magnetic tape 2.

It goes without saying that the application of the magnetic recording and reproducing apparatus is not limited to the data streamer. And, the apparatus may employ the method for recording or reproducing the data as running the magnetic tape in a single direction.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetic recording and reproducing apparatus for recording and reproducing information data on or from a magnetic tape driven by means of reels, said apparatus including a cassette capable of storing said magnetic tape, comprising;
    means for pulling or storing said magnetic tape out of or in said cassette, said pulling or storing means including a pair of guide rollers for restricting a running path of said magnetic tape, said pair of guide rollers capable of moving between an unloading position and a loading position, and
    a magnetic head for recording and reproducing information data on or from said magnetic tape when the running path of said magnetic tape is restricted by means of said pair of guide rollers at the loading position.

2. An apparatus as claimed in claim 1, wherein said apparatus comprises means for detecting a running speed of said magnetic tape and means for processing the running speed of said magnetic tape.

3. An apparatus as claimed in claim 2, wherein said means for detecting the running speed of said magnetic tape includes reflection patterns to be rotated with said pair of guide rollers, and photo interrupters for radiating light to said reflection patterns, said photo interrupters detecting the light-reflected states of said reflection patterns and generating pulse signal matching to the running speed of said magnetic tape.

4. An apparatus as claimed in claim 3, wherein said means for processing the running speed of said magnetic tape includes a central control section for processing said pulse signal sent from said photo interrupters.

5. An apparatus as claimed in claim 1, wherein said magnetic head is a thin film magnetic head.

6. An apparatus as claimed in claim 1, wherein said pulling or storing means includes a loading motor for moving said pair of guide rollers, worm wheels rotated by said loading motor, pulling arms, a pressurizing mechanism for keeping said worm wheels and said pulling arms in contact with each other, whereby said loading motor operates to rotate said worm wheels in opposite directions, rotational driving forces of said worm wheels are transmitted to said pulling arms through said pressurizing mechanism, said pulling arms are rotated in opposite directions, and rotational forces of said pulling arms cause said pair of guide rollers to move from the unloading position to the loading position.

7. An apparatus as claimed in claim 1, wherein said apparatus comprises winding angle adjusting mechanism provided on each side of said magnetic head and adjusting screws, said winding angle adjusting mechanism adjusting a winding angle of said magnetic tape against said magnetic head by turning said adjusting screws.

8. An apparatus as claimed in claim 4, wherein said central control section has a control system for controlling a running speed of said magnetic tape, said control system having a speed detector circuit for supplying a running-speed signal, a speed error detector circuit for comparing the running-speed signal with a reference signal, a compensating circuit for producing a deviation speed data based on the resulting signal of said speed error detector circuit, and a reel motor driving circuit for generating voltages for driving said reels based on said deviation speed data.

9. An apparatus as claimed in claim 4, wherein said central control section has a control system for keeping tape tension of said magnetic tape constant, said control system having a supply-side winding detector circuit for computing a tape winding radius of said reels based on signals having rotation periods of said pair of guide rollers sent from said photo interrupters, a tape tension control torque computing circuit for computing a reel-driving torque required for keeping a predetermined tape tension based on the computed tape winding radius, and a reel motor driving circuit for generating a current required for obtaining the computed reel-driving torque and supplying the current to said tape tension control torque computing circuit.

10. A magnetic recording and reproducing apparatus for recording and reproducing information data on or from a magnetic tape based on a serpentine recording method, said magnetic tape being driven by means of reels, said apparatus including a cassette capable of storing said magnetic tape, comprising:
    means for pulling or storing said magnetic tape out of or in said cassette, said pulling or storing means including a pair of guide rollers for restricting a running path of said magnetic tape, said pair of guide rollers capable of moving between an unloading position and a loading position, a multi-track magnetic head having a plurality of magnetic heads for recording and reproducing information data on or from said magnetic tape when the running path of said magnetic tape is restricted by means of said pair of guide rollers at the loading position, and means for vertically moving said multi-track magnetic head at each time when a running direction of said magnetic tape is switched.

11. An apparatus as claimed in claim 10, wherein said apparatus comprises means for detecting a vertical variation of said magnetic tape with respect to a running direction of said magnetic tape, and said means for vertically moving said multi-track magnetic head moves said multi-track magnetic head based on the vertical variation detected by said vertical variation detecting means.

12. An apparatus as claimed in claim 10, wherein said apparatus comprises means for detecting a running speed of said magnetic tape and means for processing the running speed of said magnetic tape.

13. An apparatus as claimed in claim 12, wherein said means for detecting the running speed of said magnetic tape includes reflection patterns to be rotated with said guide rollers, and photo interrupters for radiating light to said reflection pattern, said photo interrupter detecting light-reflected states of said reflection pattern and generating a pulse signal matching to the running speed of said magnetic tape.

14. An apparatus as claimed in claim 13, wherein said means for processing the running speed of said magnetic tape includes a central control section for processing said pulse signal sent from said photo interrupter.

15. An apparatus as claimed in claim 10, wherein said multi-track magnetic head is a thin film magnetic head.

16. An apparatus as claimed in claim 10, wherein said pulling or storing means includes a loading motor for moving said pair of guide rollers, worm wheels rotated by said loading motor, pulling arms, a pressurizing mechanism for keeping said worm wheels and said pulling arms in contact with each other, whereby said loading motor operates to rotate said worm wheels in opposite directions, rotational driving forces of said worm wheels are transmitted to said pulling arms through said pressurizing mechanism, said pulling arms are rotated in opposite directions, and rotational forces of said pulling arms cause said pair of guide rollers to move from the unloading position to the loading position.

17. An apparatus as claimed in claim 10, wherein said apparatus comprises a winding angle adjusting mechanism provided on each side of said multi-track magnetic head and adjusting screws, said winding angle adjusting mechanism adjusting a winding angle of said magnetic tape against said multi-track magnetic head by turning said adjusting screws.

18. An apparatus as claimed in claim 10, wherein the number of said plurality of magnetic heads is defined to be smaller than the number of tracks standardized as a track format on said magnetic tape.

19. An apparatus as claimed in claim 10, wherein said means for vertically moving said multi-track magnetic head includes a voice coil motor, said voice coil motor having a coil, permanent magnets for applying a magnetic flux on said coil, and a magnetic head fixing block, whereby a current flows through said coil applied by a magnetic flux generated by said permanent magnets and said coil yields an electromagnetic force corresponding to a direction and an electromagnetic force corresponding to a direction and a magnitude of the current so that the force allows said magnetic head fixing block to vertically move.

20. An apparatus as claimed in claim 11, wherein said means for detecting a vertical variation of said magnetic tape includes a magnetic head position detecting section, said magnetic head position detecting section having photodiodes and light-emitting diodes for radiating light to said photodiodes, said photodiodes for producing analogue signals matching to the received light, and said analogue signals indicating the relative positional relation between said magnetic tape and said photodiodes.

21. An apparatus as claimed in claim 10, wherein said means for vertically moving said multi-track magnetic head includes a head position adjusting mechanism for performing adjustments of said multi-track magnetic head.

22. An apparatus as claimed in claim 14, wherein said central control section has a control system for controlling a running speed of said magnetic tape, said control system having a speed detector circuit for generating running-speed signal, a speed error detector circuit for comparing the running-speed signal with a reference signal, a compensating circuit for producing a deviation speed data based on the resulting signal of said speed error detector circuit, and a reel motor driving circuit for generating voltages for driving said reels based on said deviation speed data.

23. An apparatus as claimed in claim 14, wherein said central control section has a control system for keeping tape tension of said magnetic tape constant, said control system having a supply-side winding detector circuit for computing tape winding radius of said reels based on signals having rotation periods of said pair of guide rollers sent from said photo interrupters, a tape tension control torque computing circuit for computing a reel-driving torque required for keeping a predetermined tape tension based on the computed tape winding radius, and a reel motor driving circuit for generating a current required for obtaining the computed reel-driving torque and supplying the current to said tape tension control torque computing circuit.

* * * * *